(12) United States Patent
Wengert et al.

(10) Patent No.: US 10,598,014 B2
(45) Date of Patent: Mar. 24, 2020

(54) TURBOMACHINE

(71) Applicant: Robert Bosch GmbH, Stuttgart (DE)

(72) Inventors: Andreas Wengert, Auenwald (DE); Bernd Banzhaf, Stuttgart (DE); Frank Ulrich Rueckert, Niluefer Bursa (TR); Nadja Eisenmenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 15/539,048

(22) PCT Filed: Nov. 25, 2015

(86) PCT No.: PCT/EP2015/077623
§ 371 (c)(1),
(2) Date: Jun. 22, 2017

(87) PCT Pub. No.: WO2016/102137
PCT Pub. Date: Jun. 30, 2016

(65) Prior Publication Data
US 2017/0350252 A1    Dec. 7, 2017

(30) Foreign Application Priority Data

Dec. 23, 2014    (DE) .................. 10 2014 226 951

(51) Int. Cl.
*F01D 3/04*    (2006.01)
*F02C 6/12*    (2006.01)

(52) U.S. Cl.
CPC .................. *F01D 3/04* (2013.01); *F02C 6/12* (2013.01); *F05D 2220/40* (2013.01)

(58) Field of Classification Search
CPC ..... F01D 3/04; F01D 3/00; F02C 6/12; F04D 29/08; F04D 29/16; F04D 29/041; F05D 2220/40
See application file for complete search history.

(56) References Cited

U.S. PATENT DOCUMENTS 3,413,925 A * 12/1968 Campolong ........ F04D 13/0613
310/52
3,433,164 A    3/1969 Neal
(Continued)

FOREIGN PATENT DOCUMENTS

| CN | 204921454 U | * | 8/2015 | ............. F01D 11/02 |
| DE | 2640990 | | 3/1978 | |

(Continued)

OTHER PUBLICATIONS

International Search Report for Application No. PCT/EP2015/077623 dated Apr. 1, 2016 (English Translation, 3 pages).

*Primary Examiner* — Grant Moubry
(74) *Attorney, Agent, or Firm* — Michael Best & Friedrich LLP

(57) ABSTRACT

The turbomachine comprises a casing (26), there being arranged in the casing an impeller (23) arranged on a driven shaft. The turbomachine has an inflow region (21) and an outflow region (22) and, in operation, is flowed through by a working medium. The working medium flows into the inflow region, along a front side (23a) formed on the impeller and subsequently out of the outflow region, there being a pressure drop at the front side between the inflow region and the outflow region. A pressure divider (9) is arranged on the rear side of the impeller, opposite the front side.

9 Claims, 7 Drawing Sheets

(56) References Cited

U.S. PATENT DOCUMENTS

| | | | |
|---|---|---|---|
| 4,170,435 A | 10/1979 | Swearingen | |
| 5,248,239 A | 9/1993 | Andrews | |
| 9,133,725 B2 * | 9/2015 | Wiebe | F04D 29/083 |
| 2008/0181546 A1 | 7/2008 | Clemens et al. | |
| 2010/0146987 A1 * | 6/2010 | Isomura | F02C 3/05 |
| | | | 60/806 |

FOREIGN PATENT DOCUMENTS

| | | |
|---|---|---|
| DE | 10003018 | 7/2001 |
| DE | 102004041439 | 3/2006 |
| DE | 102006049516 | 1/2008 |
| DE | 102009020615 | 11/2010 |
| EP | 0102334 | 3/1984 |
| EP | 0984137 | 3/2000 |
| EP | 1281836 | 2/2003 |
| WO | 2014087966 | 6/2014 |

\* cited by examiner

TURBOMACHINE

BACKGROUND OF THE INVENTION

The invention relates to turbomachine with an impeller, wherein a pressure divider is arranged on the rear side of the impeller. The turbomachine can for example be used for waste heat utilization of an internal combustion engine.

Turbomachines with a casing and an impeller which is arranged in the casing on an output shaft are known from the prior art, for example from patent document EP 1 281 836 B1. The known turbomachine has an inflow region and an outflow region and during operation is exposed to a throughflow of a working medium. The working medium flows into the inflow region, along a front side which is formed on the impeller and then flows out of the outflow region, wherein a pressure drop exists on the front side between the inflow region and the outflow region. Furthermore, the known turbomachine has at least two control valves which are controlled by a controller and control the pressure on a rear side of the impeller. As a result, the resulting hydraulic force which acts upon the impeller can be controlled so that the axial force which results therefrom is minimized. Accordingly, a thrust bearing of the output shaft is less stressed or the thrust bearing can be of smaller dimensions.

The known turbomachine, however, is very installation space and cost intensive on account of the use of the controller and the two control valves.

SUMMARY OF THE INVENTION

The turbomachine according to the invention in comparison has the advantage that the axial force which acts upon the impeller is minimized, with only low costs and low installation space requirement.

To this end, the turbomachine according to the invention comprises a casing, wherein an impeller is arranged in the casing on an output shaft. The turbomachine has an inflow region and an outflow region and during operation is exposed to a throughflow of working medium. The working medium flows into the inflow region, along a front side which is formed on the impeller and then flows out of the outflow region, wherein a pressure drop exists on the front side between the inflow region and the outflow region. A pressure divider is arranged on the rear side of the impeller opposite the front side so that at least a part of the rear side is loaded with a lower pressure than the pressure of the inflow region.

The pressure divider is preferably constructed as a steam-lubricated seal. In this case, the seal preferably comprises a slide ring which interacts with the rear side of the impeller. The steam-lubricated sealing is preferably effected in a contactless manner with a very narrow sealing gap. As a result, a very low friction loss results and also very low wear. The steam-lubricated seal can in this case also be considered to be a throttle with an exceptionally small flow cross section.

The slide ring preferably interacts with the rear side of the impeller in the axial direction. Consequently, the susceptibility of the seal with regard to shape tolerances and positional tolerances is less prone. The sealing effect is therefore optimized and wear of the seal minimized.

The steam-lubricated seal, in advantageous embodiments, can also be considered to be a throttle with an exceptionally small flow cross section. The function of the steam-lubricated pressure divider is therefore in essence the ensuring of a contactless throttling point which is defined as small as possible in order to ensure a pressure dividing function with this.

The pressure divider leads to a jump in the pressure characteristic of the pressure which acts upon the rear side, or lowers the pressure which acts upon at least a part of the rear side, in relation to the pressure level of the inflow region. Consequently, the resulting hydraulic force which acts upon the impeller is established.

In an advantageous development, a shaft sealing ring is arranged on the casing, wherein the shaft sealing ring interacts with the output shaft. A pressure chamber is formed between the casing, the shaft sealing ring, the impeller and the pressure divider. The shaft sealing ring seals the pressure chamber in relation to an ambient space, for example in relation to atmosphere or to a gear space of a gear which is mechanically connected to the output shaft. The pressure chamber can be hydraulically closed-loop or open-loop controlled via a valve. To this end, it can for example be hydraulically connected, or able to be hydraulically connected, to other volumes of the expansion machine. The surfaces of the impeller which are adjacent to the pressure chamber are consequently acted upon by the pressure of the pressure chamber. Therefore, the resulting axial force which acts upon the impeller can be open-loop or closed-loop controlled.

In an advantageous development, the pressure chamber is hydraulically connected to the outflow region. Consequently, at least a part of the rear side of the impeller is acted upon by the pressure level of the outflow region, by the outflow pressure, or by a pressure level which is open-loop controlled by the outflow pressure. As a result of the fact that the pressure load on the front side of the impeller also depends on the outflow pressure, the pressure loads on the front side and rear side of the impeller are altered in a similar manner if the turbomachine is operated at different operating points. The resulting axial force which acts upon the impeller can in this way be maintained at a constantly low level. The level of axial force, however, is preferably established so that at the various operating points a change of direction of the axial force does not occur since the axial force has to therefore be absorbed only in one direction.

In an advantageous embodiment of the invention, the hydraulic connection from the pressure chamber to the outflow region is effected via at least one hole which is formed in the output shaft. As a result, the hydraulic connection is implemented without additional installation space requirement and in a cost-effective manner. In an alternative, the hydraulic connection can also be effected by means of a hole which is formed in the impeller.

In an advantageous development, the pressure divider subdivides the rear side of the impeller with regard to the pressure load during operation into a first region and a second region. During operation, the first region is loaded with a higher pressure than the second region. The pressure divider subdivides the volume filled with working medium which is adjacent to the rear side so that the two regions of the rear side are acted upon by different pressures. Therefore, a desired resulting axial force is established. In an advantageous embodiment, the pressure chamber is formed as a result of this arrangement, and the second region forms a wall of the pressure chamber. The two regions can be advantageously hydraulically connected to volumes of the turbomachine so that pressure levels which are present in the turbomachine can be accessed in any case. The arrangement of an additional pressure chamber for axial force control can consequently be dispensed with.

In an advantageous embodiment, the first region is acted upon by the pressure level of the inflow region. In a large number of turbomachines, especially in the case of radial turbines, the rear side of the impeller is acted upon by the pressure level of the inflow region anyway in various embodiments. Therefore, this pressurizing can be carried out in a cost-neutral manner. Furthermore, the pressure level of the inflow region can be open-loop and closed-loop controlled comparatively constantly or very well so that the pressurizing of the first region can also be controlled very robustly or very easily.

In an advantageous development, the second region is acted upon by the pressure level of the outflow region. The pressure level of the outflow region can also be open-loop and closed-loop controlled comparatively constantly or very easily so that the pressurizing of the second region can also be controlled very robustly or very easily.

In an advantageous embodiment, the pressure divider is constructed as a throttle. This is a very inexpensive embodiment since preferably only a comparatively smaller gap between the impeller and the casing has to be provided. Particularly for embodiments in which the pressure chamber is connected to the outflow region, the embodiment of the pressure divider as a throttle can be very advantageous since then a leakage through the throttle is on the one hand very easily controllable and on the other hand reduces the efficiency of the turbomachine only very slightly.

In another advantageous embodiment, the pressure divider is constructed as a labyrinth seal. Labyrinth seals have the advantage that they work in a contactless manner, therefore free of wear, and still achieve a very good sealing effect. The low leakage has to be taken into consideration in the design of the turbomachine, however, since the labyrinth seal acts like a very powerful throttle with a long throttle length.

In another advantageous embodiment, the pressure divider is constructed as a media-tight seal, preferably as a brush holder with a brush head, or as a sealing ring with sealing lip. This embodiment has the advantage that there is no requirement for additional sealing between the output shaft and the casing. Depending on the pressure to be sealed, for example the inflow pressure in the case of radial turbines, and rotational speed of the output shaft, the person skilled in the art selects in this case the optimum media-tight seal with regard to leak tightness during the service life and to wear resistance.

In another advantageous embodiment of the turbomachine according to the invention, the pressure divider is constructed as a media-tight seal, wherein the pressure divider subdivides the rear side into a first region and a second region. The first region is acted upon by the pressure level of the inflow region, and the second region is acted upon either by the ambient pressure or by the pressure level of a gear which is mechanically connected to the output shaft. Consequently, the pressure divider likewise undertakes the sealing function of the turbomachine in relation to attached components, such as a gear or a generator, or in relation to the environment. In this embodiment, a shaft sealing ring between casing and output shaft can be dispensed with.

In advantageous embodiments, the turbomachine is constructed as a radial turbine. As a result, the rear side of the impeller, by means of comparatively simple constructional embodiments, can be loaded with the pressures which are established by the pressure divider, while the main flow direction of the working medium extends on the front side of the impeller.

In preferred embodiments, the turbomachine according to the invention, constructed as an expansion machine, is arranged in a waste heat recovery system, especially of an internal combustion engine. The waste heat recovery system comprises, in the flow direction of the working medium, a pump, an evaporator, the turbomachine and a condenser. The waste heat recovery system is preferably not operated at a single operating point but at very different operating points since the internal combustion engine is also operated at different operating points. As a result, it is very favorable for the overall efficiency and the service life of the waste heat recovery system if the turbomachine can also run during the different operating conditions without the thrust bearings of the output shaft being excessively worn. The turbomachine according to the invention is as a consequence particularly well suited to this.

DETAILED DESCRIPTION

Figure 1:
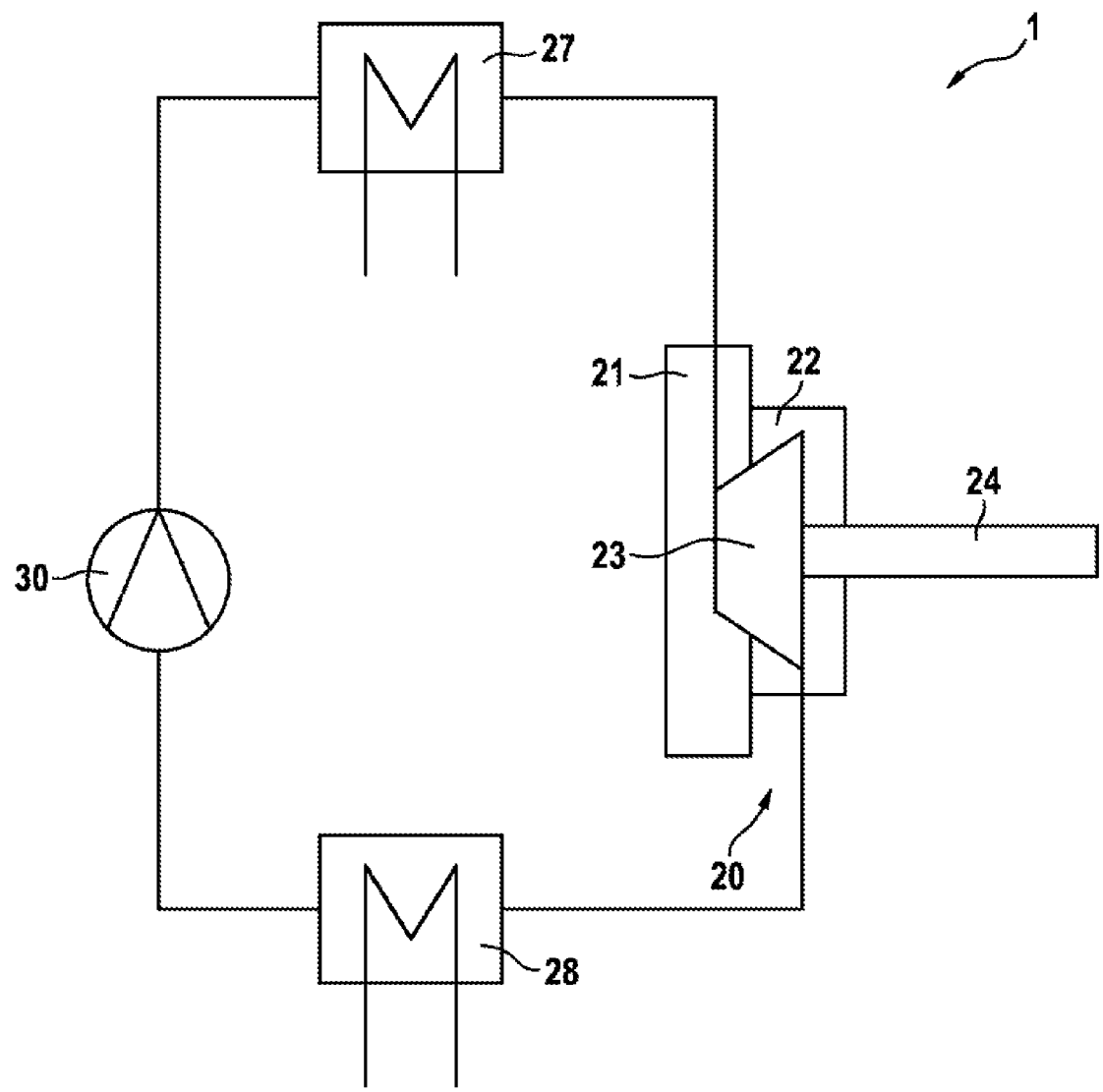
FIG. 1 schematically shows a turbomachine according to the invention inside a waste heat recovery system, wherein only the essential regions are shown.

FIG. 1 schematically shows a turbomachine 20 according to the invention inside a waste heat recovery system 1, wherein only the essential regions are shown. Arranged in the waste heat recovery system 1, in the flow direction of a working medium, are a pump 30, an evaporator 27, a turbomachine 20 and a condenser 28. The evaporator 27 is also connected to an exhaust gas pipe, not shown, of an internal combustion engine, not shown.

Liquid working medium is compressed by the pump 30 and delivered to the evaporator 27 where it is evaporated by means of the thermal energy of the exhaust gas of the internal combustion engine. The evaporated working medium is then fed to the turbomachine 20 where it is expanded, delivering mechanical energy. In this exemplary embodiment, the turbomachine 20 it is therefore operated as a steam turbine. The working medium is then liquefied again in the condenser 28.

The turbomachine 20 has an output shaft 24 via which mechanical power can be delivered, for example to a generator, to a turbocharger or to a gear. The turbomachine 20 furthermore comprises an inflow region 21, an impeller 23 and an outflow region 22. The compressed working medium flows into the turbomachine 20 in the inflow region 21, flows there along the impeller 23 and then flows out of the turbomachine again in the outflow region 22. While flowing through the turbomachine 20, the working medium is expanded between inflow region 21 and outflow region 22. The mechanical energy which is delivered in the process is transmitted by means of the output shaft 24 to one or more users, which are not shown.

Figure 2:
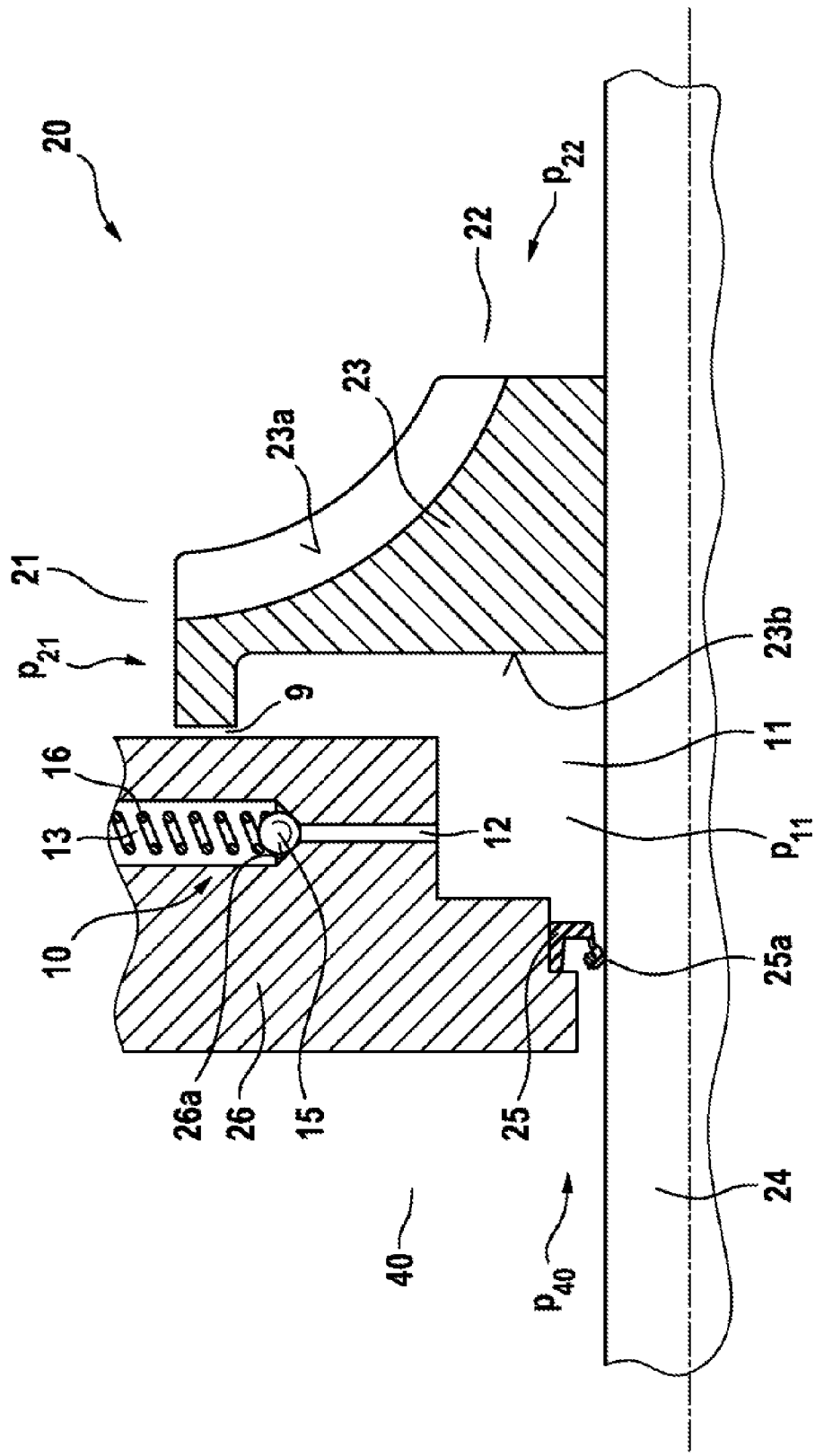
FIG. 2 schematically shows an exemplary embodiment of the turbomachine, wherein only the essential regions are shown.

FIG. 2 schematically shows an exemplary embodiment of the turbomachine 20, wherein only the essential regions are shown. In this exemplary embodiment, the turbomachine 20 is a radial turbine, wherein by reversal of the flow direction of the working medium the turbomachine 20 can also be operated as a pump.

The turbomachine 20 comprises a casing 26, and arranged in the casing 26 are the impeller 23 which is arranged on the output shaft 24, the inflow region 21, the outflow region 22, a pressure divider 9, a valve 10, a pressure chamber 11 and a shaft sealing ring 25. In the exemplary embodiment of FIG. 2, the pressure divider 9 is designed as a throttle.

The inflow region 21 has an inflow pressure $p_{21}$, and the outflow region 22 has an outflow pressure $p_{22}$. The working medium flows along a front side 23a of the impeller 23 from the inflow region 21 to the outflow region 22 and is expanded in the process so that a pressure drop is created between the inflow pressure $p_{21}$ and the outflow pressure $p_{22}$.

The pressure chamber 11, which is under the compensation pressure $p_{11}$, is formed on the rear side 23b of the impeller 23, which is opposite the front side 23a, between the casing 26 and the impeller 23. With regard to the impeller 23, the compensation pressure $p_{11}$ counteracts the axial components of the inflow pressure $p_{21}$ and of the outflow pressure $p_{22}$ on the front side 23a.

The shaft sealing ring 25 which is arranged on the casing 26 interacts with the output shaft 24 by means of a sealing lip 25a which is arranged on the sealing ring and as a result seals the pressure chamber 11, which is under compensation pressure $p_{11}$, against a ambient space 40, which is under ambient pressure $p_{40}$. The valve 10, which acts as a pressure maintaining valve for the pressure chamber 11, is arranged in the casing 26. Depending on the main operating states of ambient space 40 and pressure chamber 11, the sealing lip 25a can in this case therefore be arranged as shown in FIG. 2, or else so that the compensation pressure $p_{11}$ presses the sealing lip 25a against the output shaft 24.

The valve 10 comprises an inlet passage 12, an outlet passage 13, a spherical closing body 15 and a closing spring 16. The inlet passage 12 opens into the pressure chamber 11. The outlet passage 13 advantageously opens into a region which has a lower pressure than the pressure chamber 11, for example into the outflow region 22. The closing body 15 interacts with a valve seat 26a which is formed on the casing 26 and consequently opens and closes a hydraulic connection from the inlet passage 12 to the outlet passage 13. The closing spring 16 presses the closing body 15 against the valve seat 26a. By means of the closing spring 16, a minimum pressure can therefore be established in the pressure chamber 11.

The pressure divider 9 is designed as a throttle between the casing 26 and the impeller 23 or the rear side 23b. The pressure divider 9 hydraulically connects the pressure chamber 11 to the inflow region 21. In this case, the entire rear side 23b is acted upon by the compensation pressure $p_{11}$ of the pressure chamber in this exemplary embodiment. This, however, is not absolutely necessary. In alternative embodiments, the pressure divider 9 can also be arranged so that a first region of the rear side 23b is acted upon by the inflow pressure $p_{21}$ and only a second region of the rear side 23b is acted upon by the compensation pressure $p_{11}$.

In embodiments alternative to FIG. 2, the pressure chamber 11 can also be connected via the pressure divider 9 to a mixing region between inflow region 21 and outflow region 22. However, attention is to be paid to the fact that on the pressure divider 9 the region opposite the pressure chamber 11—regardless of whether it is inflow region 21 or mixing region—has a greater pressure than the outflow region 22 during operation of the turbomachine 20.

Figure 3:
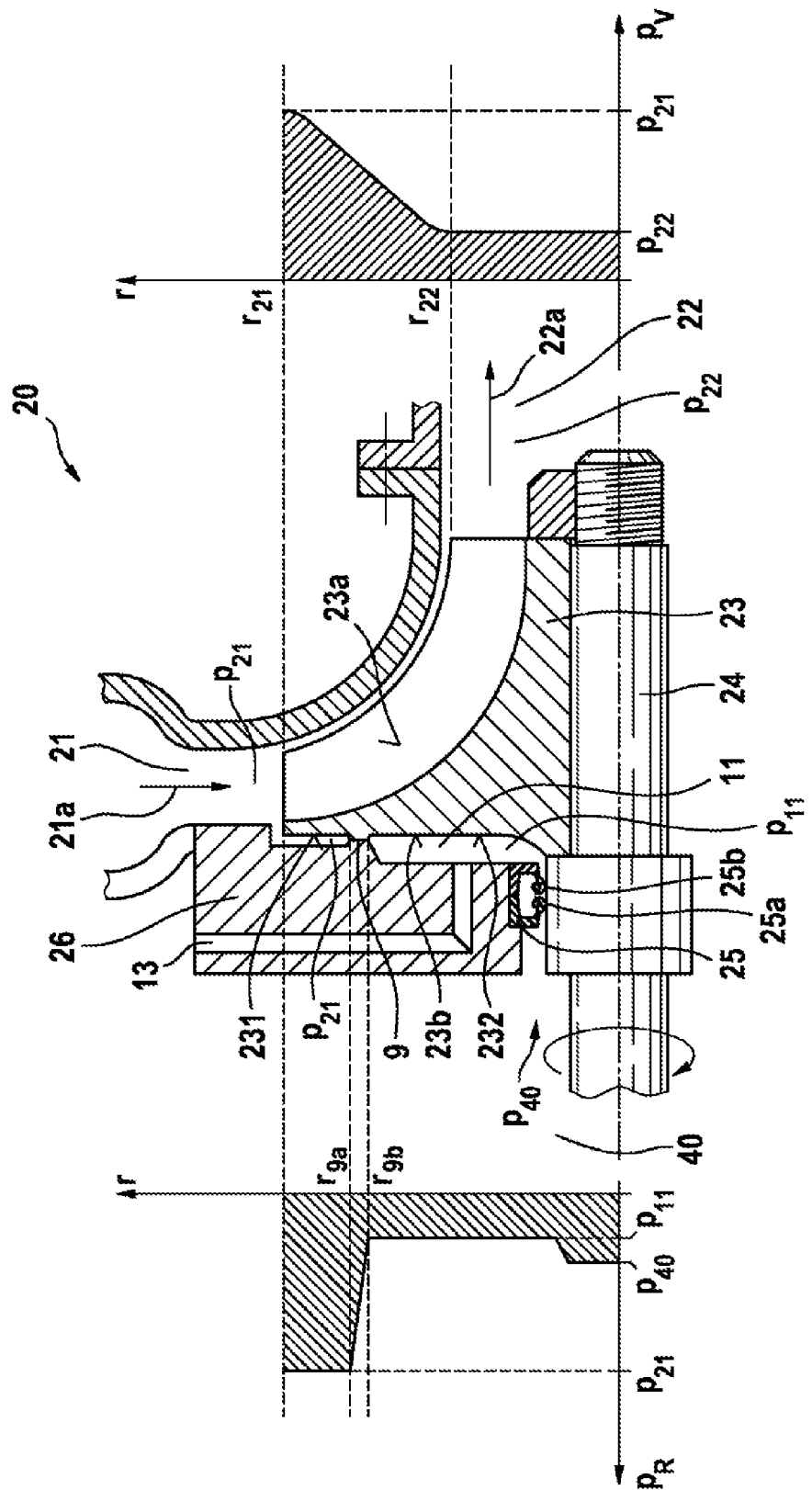
FIG. 3 schematically shows a further exemplary embodiment of the turbomachine, wherein only the essential regions are shown.

FIG. 3 schematically shows a further exemplary embodiment of the turbomachine 20, wherein only the essential regions are shown. This turbomachine 20 is also designed as a radial turbine with an inflow direction 21a of the working medium in the inflow region 21 and an outflow direction 22a of the working medium in the outflow region 22. The turbomachine 20 of this exemplary embodiment, by reversal of the flow directions 21a, 22a, can also be operated as a pump.

FIG. 3 furthermore shows the pressure characteristics $p_V$ and $P_R$ on the front side 23a or on the rear side 23b of the impeller 23.

In large parts, the turbomachine 20 of the exemplary embodiment of FIG. 3 is constructed in a similar manner to the exemplary embodiment of FIG. 2 so that these parts no longer have to be further dealt with. Designed differently to FIG. 2 are:

The shaft sealing ring 25 has two sealing lips 25a and 25b so that the pressure chamber 11 can be well sealed in relation to the ambient space 40 is both directions.

The pressure divider 9 is not arranged on the outermost periphery of the impeller 23 but arranged between the outermost periphery and the diameter of the output shaft 24 so that on the rear side 23b a first region 231 is acted upon by the inflow pressure $p_{21}$ of the inflow region 21 and a second region 232 is acted upon by the lower pressure of the pressure chamber 11, specifically by the compensation pressure $p_{11}$.

There is no valve 10 shown, but only one outlet passage 13 which leads out of the pressure chamber 11. Here, in various developments, a valve can still be arranged but at the other end of the outlet passage 13. The outlet passage 13 can, however, also be connected to the ambient space 40, to the outflow region 22 or to a further volume, for example under atmospheric pressure.

Also shown in FIG. 3 are the pressure characteristics on the impeller 23 over the radius r of the impeller 23;

in the left hand diagram, the pressure characteristic $p_R$ on the rear side 23b is shown.

in the right hand diagram, the pressure characteristic $p_V$ on the front side 23a is shown.

The pressure characteristic $p_V$ on the front side 23a shows a steady fall of the pressure from the inflow pressure $p_{21}$ to the outflow pressure $p_{22}$ with decreasing radius r.

The pressure characteristic $p_R$ on the rear side 23b shows the constant inflow pressure $p_{21}$ at the first region 231, a steady fall of the pressure across the pressure divider 9 from the inflow pressure $p_{21}$ to the compensation pressure $p_{11}$, a constant compensation pressure $p_{11}$ at the second region 232 and a pressure jump at the shaft sealing ring 25 from the compensation pressure $p_{11}$ to the ambient pressure $p_{40}$. In this case—depending on design of the turbomachine 20 and depending on operating point in which it is operated—the compensation pressure $p_{11}$ can be lower (as shown in FIG. 3) or even be of equal value or higher than the ambient pressure $p_{40}$.

The shaft sealing ring 25 can also be designed alternatively to the embodiment of FIG. 3, specifically by the two sealing lips 25a, 25b being curved differently to the way shown in FIG. 3 so that the compensation pressure $p_{11}$ presses the sealing lip 25b against the output shaft 24 and the ambient pressure $p_{40}$ presses the sealing lip 25a against the output shaft 24.

Figure 4:
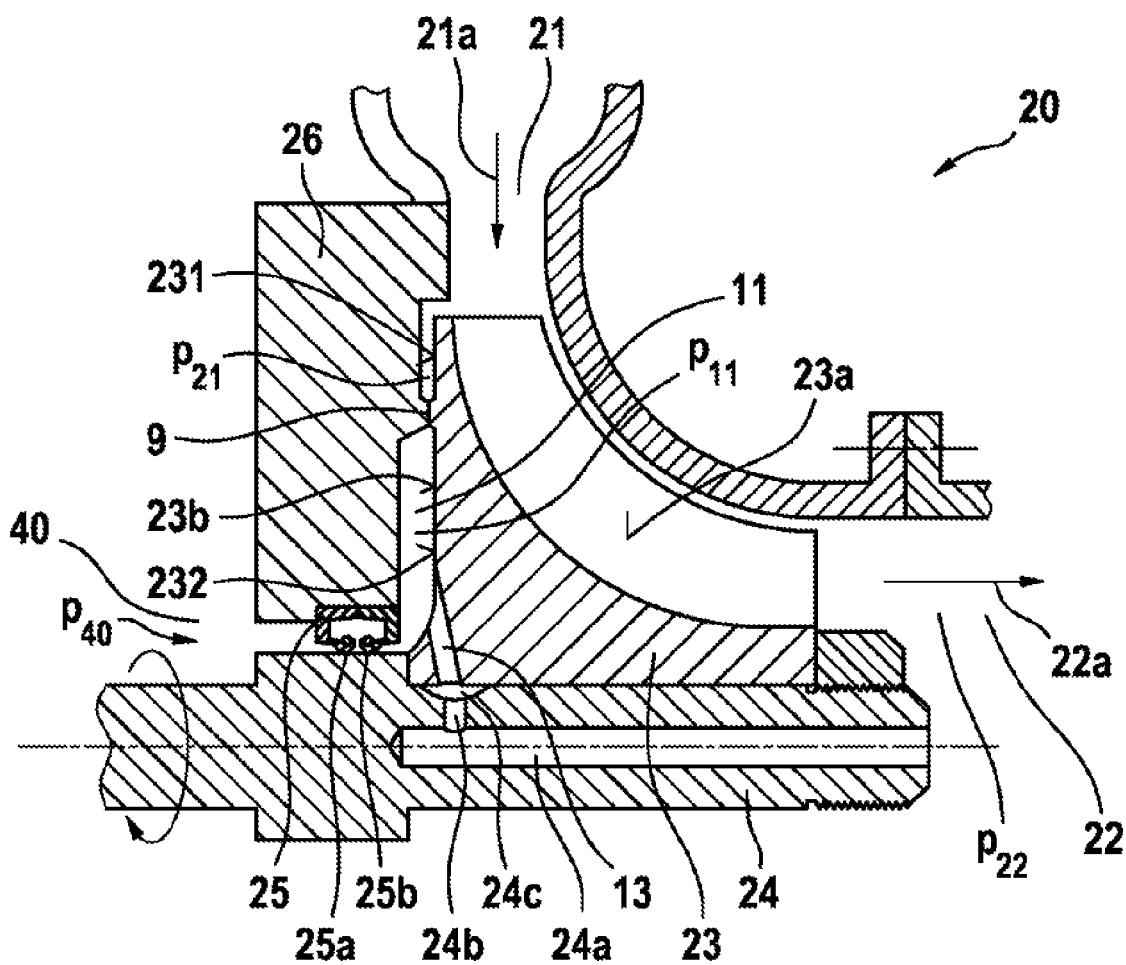
FIG. 4 schematically shows a further exemplary embodiment of the turbomachine, wherein only the essential regions are shown.

FIG. 4 schematically shows a further exemplary embodiment of the turbomachine 20, wherein only the essential regions are shown. The exemplary embodiment of FIG. 4 is similar to the exemplary embodiment of FIG. 3 so that only the differences are dealt with in the following text.

In contrast to FIG. 3, in the exemplary embodiment of FIG. 4 the outlet passage 13 is formed in the impeller 23. A blind hole 24a is formed in the output shaft 24 in the axial direction. Furthermore, a connecting hole 24b and a groove 24c on the surface on the output shaft 24 which hydraulically connects the outlet passage 13 to the connecting hole 24b, are formed in the output shaft 24 radially to the blind hole 24a. The blind hole 24a opens into the outflow region 22. Consequently, a hydraulic connection in the flow direction of the working medium from the pressure chamber 11 via the groove 24c, the connecting hole 24b and the blind hole 24a to the outflow region 22 is realized. In the exemplary embodiment of FIG. 4, the connecting hole 24b and the blind hole 24a have no throttling function. Therefore, the pressure chamber 11 has the same pressure level as the outflow region 22: $p_{11}=p_{22}$.

In alternative embodiments, the connecting hole 24b and/or the blind hole 24a can also have a throttling function, however. Then $p_{11}>p_{22}$ applies.

In alternative embodiments to FIG. 4, the hydraulic connection from the pressure chamber 11 to the outflow region 22 is also effected by means of one or more holes which are formed in the impeller 23.

Figure 5:
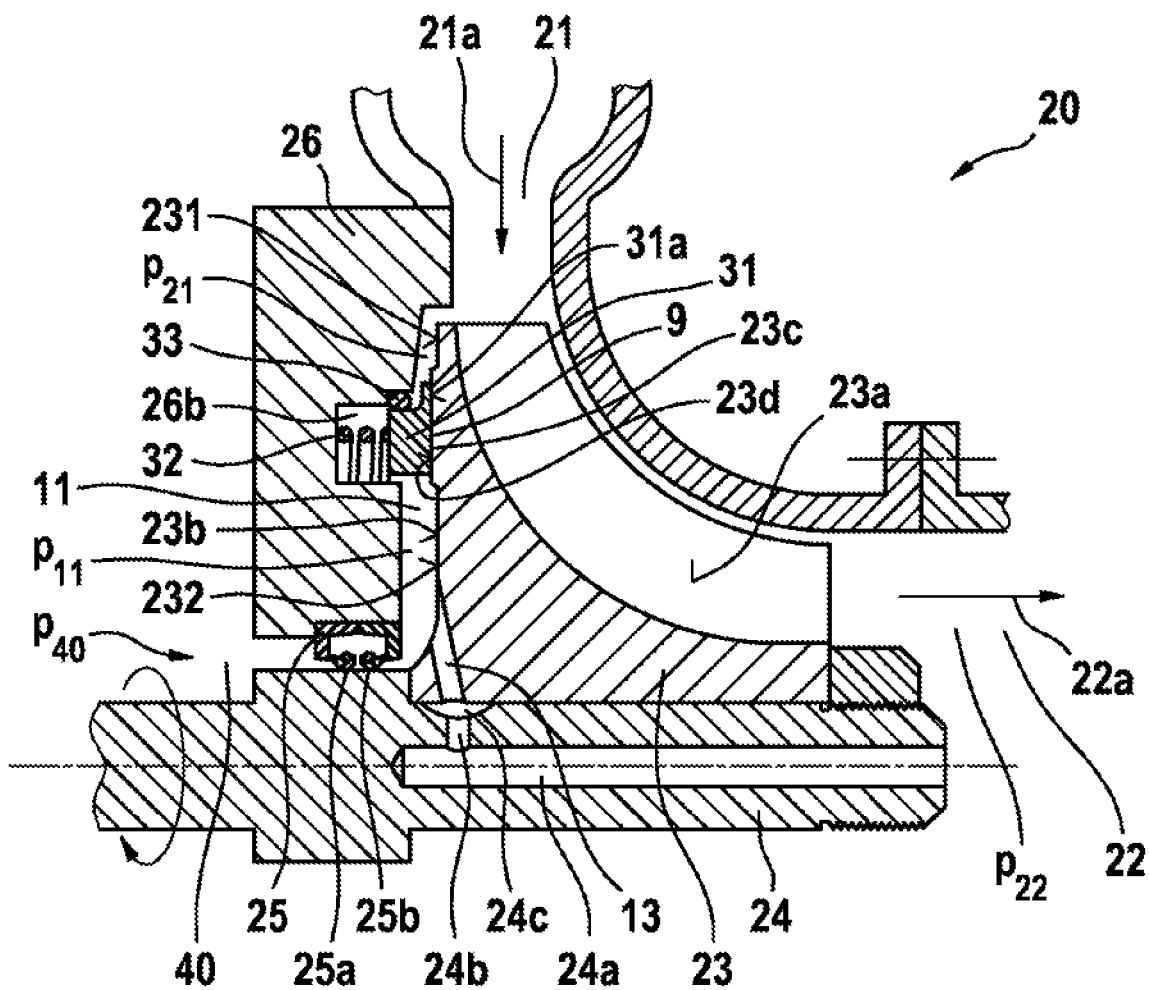
FIG. 5 schematically shows a further exemplary embodiment of the turbomachine, wherein only the essential regions are shown.

FIG. 5 schematically shows a further exemplary embodiment of the turbomachine 20, wherein only the essential regions are shown. The exemplary embodiment of FIG. 5 is similar to the exemplary embodiment of FIG. 4 so that only the differences are dealt with in the following text.

The pressure divider 9 in the exemplary embodiment of FIG. 5 is designed differently to FIG. 4, specifically as a steam-lubricated seal, wherein the evaporated working medium is used as a steam cushion. A shoulder 23c is arranged on the rear side 23b of the impeller 23. A slide surface 23d is arranged on the shoulder 23c on the end face in the direction of the casing 26. A location groove 26b is formed in the casing 26 opposite the slide surface 23d. A sliding ring 31 is arranged at least partially inside the location groove 26b. An end face 31a which is formed on the slide ring 31 interacts with the slide surface 23d preferably in the axial direction of the impeller 23. A slide ring spring 32 which is arranged in the location groove 26b pretensions the slide ring 31 against the impeller 23. A sealing ring 33, which seals the slide ring 31 in relation to the casing 26, is arranged radially between slide ring 31 and casing 26.

In developments of the invention, lubrication pockets are formed in the slide surface 23d in which lubrication pockets evaporated working medium can accumulate during operation so that a tribologically very favorable steam cushion is formed between the slide surface 23d and the end face 31a.

At low rotational speeds of the impeller 23, the slide ring 31 comes to butt by its end face 31a against the slide surface 23d of the impeller 23 as a result of the spring force of the slide ring spring 32. The hydraulic connection from the inflow region 21 to the pressure chamber 11 is broken. At high rotational speeds of the impeller 23, a slide film or a steam cushion of the working medium is formed between the slide surface 23d and the end face 31a so that the two surfaces are lifted apart and as a result a throttling point is formed, wherein on account of the steam cushion only a very small leakage takes place from the inflow region 21 into the pressure chamber 11.

The axial effective direction of the contact between the slide surface 23d and the end face 31a compared with a radial effective direction has the advantage that a possible unevenness of these two flat surfaces 23d, 31a has considerably less negative effects upon the leak tightness and wear than a deviation from the coaxiality or cylindricity of alternative cylindrical surfaces.

Figure 6:
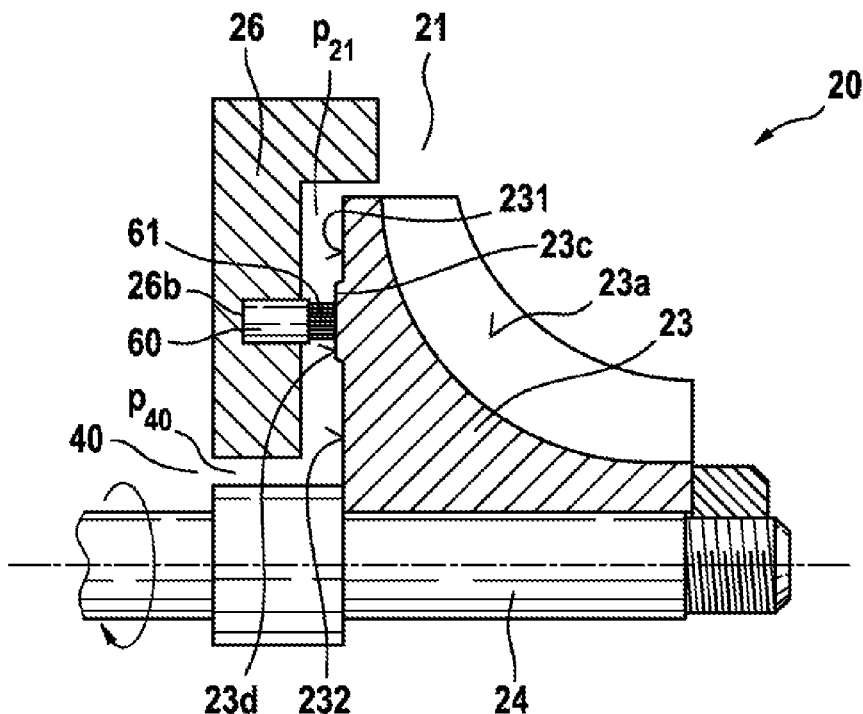
FIG. 6 shows a further exemplary embodiment of the turbomachine according to the invention in the region of the pressure divider, wherein only the essential regions are shown.
Figure 7:
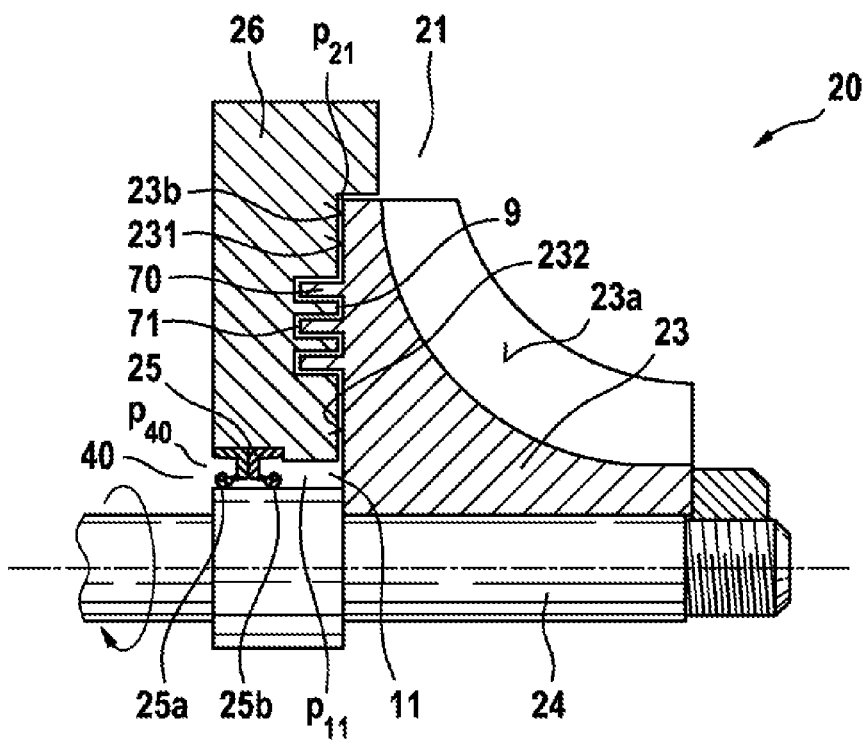
FIG. 7 shows a further exemplary embodiment of the turbomachine according to the invention in the region of the pressure divider, wherein only the essential regions are shown.
Figure 8:
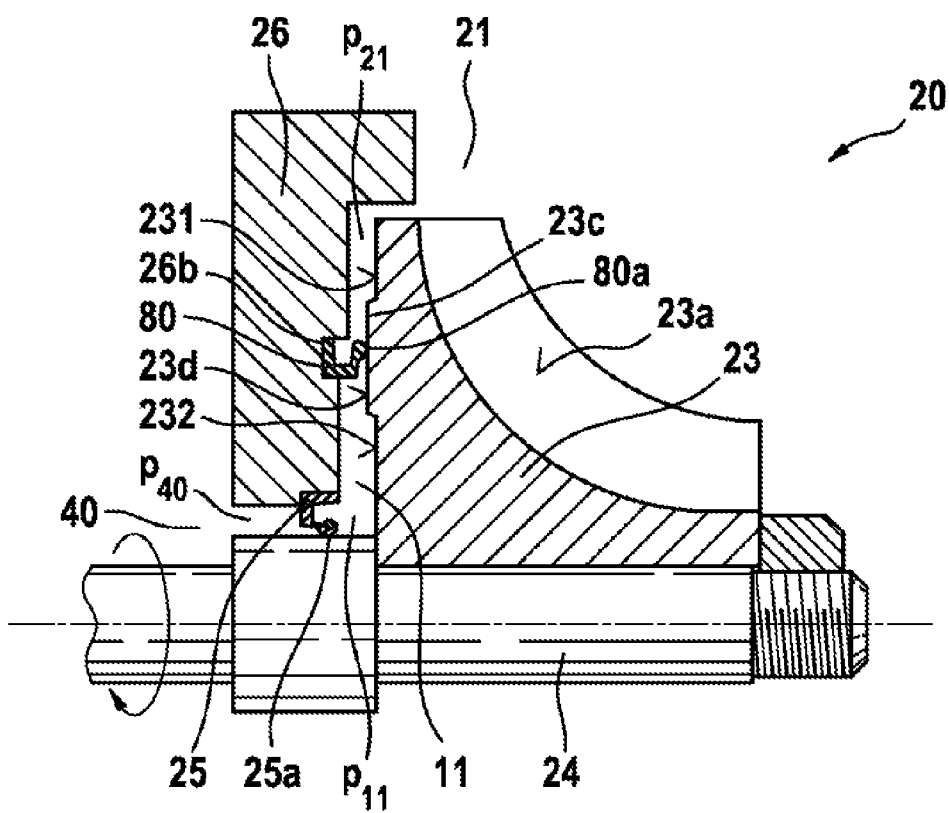
FIG. 8 shows a further exemplary embodiment of the turbomachine according to the invention in the region of the pressure divider, wherein only the essential regions are shown.

FIGS. 6 to 8 show further embodiments of the turbomachine 20 according to the invention in the region of the pressure divider 9 between casing 26 and impeller 23, wherein the pressure divider 9 can also be designed as a sealing point.

FIG. 6 shows a brush holder 60 which is arranged in the location groove 26b. Arranged on the brush holder 60 is a brush head 61 which interacts with the slide surface 23d of the impeller 23 which is formed on the shoulder 23c. Depending on the design of the tribological system between brush head 61 and slide surface 23d under the various operating conditions of the turbomachine 20, the contact between brush head 61 and slide surface 23d can be made with throttling effect or with media-tight effect. A throttling point or a sealing point is then provided accordingly. For when the contact acts only with throttling effect, the shaft sealing ring 25 has to be used for sealing between output shaft 24 and casing 26. For when the contact is designed with media-tight effect, the shaft sealing ring 25 can be dispensed with since the impeller 23 is then already sealed in relation to the casing 26.

In the exemplary embodiment of FIG. 6, the contact between brush head 61 and sliding surface 23c is made with media-tight effect so that no shaft sealing ring is arranged between output shaft 24 and casing 26. As a result, the brush head 61 seals the inflow pressure $p_{21}$ of the inflow region 21 against the ambient pressure $p_{40}$ of the ambient space 40. As a consequence, no pressure chamber either is formed in this exemplary embodiment.

Also in this exemplary embodiment, the contact between brush head 61 and slide surface 23d is preferably made in the axial effective direction in order to achieve a robust sealing effect and wear which is as low possible.

FIG. 7 shows the embodiment of the pressure divider 9 as a labyrinth seal. For this, a plurality of sealing shoulders 70 are arranged in a louvre-like manner on the rear side 23b of the impeller 23. Corresponding to this, an equal number of sealing grooves 71 are formed in the casing 26. The sealing shoulders 70 and the sealing groves 71 mesh with each other so that the sealing gap or the throttling length of the pressure divider 9 is of very long design as a consequence. The labyrinth seal which is designed in this way is not constructed with completely media-tight effect so that the shaft sealing ring 25 with the two sealing lips 25a and 25b is arranged between the casing 26 and the output shaft 24.

On account of the pressure divider 9 and the shaft sealing ring 25, the pressure chamber 11 is also formed between pressure divider 9, impeller 23, shaft sealing ring 25 and casing 26 in the exemplary embodiment of FIG. 7. Applicable to the pressure level of inflow region 21, pressure chamber 11 and ambient space 40 is: $p_{21} > p_{11} > p_{40}$ or $p_{21} > p_{40} > p_{11}$ (if the pressure chamber 11 is for example connected to the outflow region 22 and the turbomachine 20, constructed as a radial turbine, is operated in negative-pressure operation)

In an alternative embodiment, the sealing shoulders 70 can also be formed on the casing 26 and the sealing grooves 71 can be formed on the impeller 23.

FIG. 8 shows a shaft sealing ring 25, with a sealing lip 25a, which is arranged between the casing 26 and the output shaft 24. In addition, an additional sealing ring 80, with an additional sealing lip 80a, is arranged between the casing 26 and the impeller 23. The additional sealing ring 80 is arranged in the location groove 26b of the casing 26. The additional sealing lip 80a interacts with the slide surface 23d of the impeller 23 which is formed on the shoulder 23c.

Consequently, the pressure chamber 11 is formed between shaft sealing ring 25 casing 26, additional sealing ring 80 and impeller 23. The additional sealing ring 80 separates the inflow region 21 from the pressure chamber 11 customarily with media-tight effect so that no throttling point is formed. Applicable to the pressure level of inflow region 21, pressure chamber 11 and ambient space 40 is in this case also: $p_{21} > p_{11} > p_{40}$ or $p_{21} > p_{40} > p_{11}$. The sealing lip 25a and the additional sealing lip 80a are in this case always arranged so that they are curved toward the volume with the higher pressure level so that they pressed by this pressure level onto the sealing surface of its sealing partner, that is to say impeller 23 or output shaft 24.

The principle of operation of the turbomachine 20 according to the invention is as follows: During operation of the turbomachine 20, there is a pressure drop on the front side 23a of the impeller 23. If the turbomachine 20 is operated as a radial turbine, as shown in the exemplary embodiments of FIGS. 2 to 8, then the pressure from the radially outer inflow region 21 to the radially inner outflow region 22 drops from inflow pressure $p_{21}$ to outflow pressure $p_{22}$. If the turbomachine is operated as a pump, then the flow direction of the working medium is reversed and the two regions comprising inflow region 21 and outflow region 22 are also in a correspondingly reversed arrangement. Nevertheless, there is also a pressure drop on the front side 23a for these embodiments.

The pressure drop on the front side 23a creates an axial force upon the impeller 23, that is to say a force which is oriented opposite to the outflow direction 22a in the case of a radial turbine. According to the invention, the pressure on the rear side 23b of the impeller 23 is now designed with the aid of the pressure divider 9 so that this pressure creates approximately a counteracting force of equal magnitude to the axial force which acts upon the front side 23a so that the resulting hydraulic force which acts upon the impeller 23 in the axial direction is approximately zero. As a consequence, simple and therefore inexpensive and installation space-saving thrust bearings can be used for the impeller 23 or the output shaft 24. The pressure on the rear side 23b is advantageously designed so that a resulting hydraulic force which is as low as possible during all operating states is applied in a fixed direction so that the corresponding thrust bearings also only have to absorb forces in one direction.

According to the invention, the pressure which is applied on the rear side 23b is divided into the first region 231 with inflow pressure $p_{21}$ and the second region 232 which has either compensation pressure $p_{11}$ or ambient pressure $p_{40}$.

Applicable to operation of the turbomachine 20 as a radial turbine are:

$p_{21} > p_{22}$ to the embodiments with pressure chamber 11:
  $p_{21} > p_{11} > p_{40}$ or $p_{21} > p_{40} > p_{11}$
to the embodiments without pressure chamber: $p_{21} > p_{40}$.

According to the invention, the partial surfaces of the rear side 23b, that is to say the first region 231 and the second region 232 with the pressures $p_{21}$ and $p_{11}$ or $p_{40}$, now have to be dimensioned and the pressure $p_{11}$ or $p_{40}$ optionally selected so that the desired resulting hydraulic force upon the impeller 23 is achieved. In this case, this resulting hydraulic force cannot naturally be kept constant during all operating states but is to move within an optimum range, preferably so that the direction or orientation of the axial force remains the same.

In the case of the measures for reducing the axial force, the operation with gap seals or brush seals is used for sealing the different pressure regions ($p_{11}$ and $p_{21}$). According to which solution is selected, certain losses which arise on account of leakage and/or friction have to be taken into account. Contacting seal systems admittedly have in this case low losses because of leakage but correspondingly high friction and wear. Contactless seal systems require very close tolerances and are also limited with regard to minimum gaps on account of rotor-dynamic effects.

Particularly advantageous, therefore, is a seal system which on the one hand operates in a contactless manner, and on the other hand ensures a minimum leakage gap which regardless of tolerances and rotor-dynamic effects adjusts and regulates itself.

The steam or gas-lubricated pressure divider 9 according to the invention combines these characteristics.

In this case, the impeller 23 is axially in direct contact with a corresponding microstructure and with the slide ring 31. The slide ring 31 is preferably supported in a floating manner in the casing 26, is held in its axial initial position by means of a comparatively low spring force and via an additional seal—preferably the sealing ring 33—is sealed in relation to the casing 26. The slide ring 31 is advantageously locked in its rotation.

If the turbomachine 20 is put into operation, a local gas/steam pressure builds up between impeller 23 and slide ring 31, the resulting force of which effects floating of the slide ring 31. The gap height which is established can be correspondingly designed via different design parameters (for example diameters, depths and shape of the microstructure, spring force, damping). In this way, gap heights of between 2 μm and 20 μm are preferably established. The gap height in this case is in the main independent of the tolerance-affected initial position of the impeller 23 in relation to the casing 26 and independent of the dynamic movements of the impeller 23. This is ensured by the slide ring 31 being able to follow the impeller 23 on account of its floating support. The stable force relationships on the slide ring 31 consisting of pressing-on force and opening force are designed so that the slide ring 31, despite a certain inertia, can follow the movements the impeller 23. According to the invention, this is achieved as the result of an axial effective direction between the slide ring 31 and the impeller 23.

The invention claimed is:

1. A turbomachine (20) with a casing (26), wherein an impeller (23), which is arranged on an output shaft (24) for rotation about an axis, is arranged in the casing (26), wherein the turbomachine (20) has an inflow region (21) and an outflow region (22) and during operation is exposed to a throughflow of working medium, wherein the working medium flows into the inflow region (21), along a front side (23*a*) which is formed on the impeller (23) and then flows out of the outflow region (22), wherein a pressure drop exists on the front side (23*a*) between the inflow region (21) and the outflow region (22), wherein a pressure divider (9) is arranged on a rear side (23*b*) of the impeller (23) which is opposite the front side (23*a*) so that during operation at least a part of the rear side (23*b*) is loaded with a lower pressure than the pressure of the inflow region (21), characterized in that the pressure divider (9) comprises a slide ring (31) which, at a first operating point of the turbomachine (20), presses directly in an axial direction against the rear side (23*b*) of the impeller (23), and which, at a second operating point of the turbomachine (20) with higher speed than the first operating point, floats on a cushion of the working medium that lifts the slide ring (31) away from the rear side (23*b*) to form a throttling point.

2. The turbomachine (20) as claimed in claim 1, characterized in that a shaft sealing ring (25) is arranged on the casing (26), wherein the shaft sealing ring (25) interacts with the output shaft (24) and wherein a pressure chamber (11) is formed between the casing (26), the shaft sealing ring (25), the impeller (23) and the pressure divider (9).

3. The turbomachine (20) as claimed in claim 2, characterized in that the pressure chamber (11) is hydraulically connected to the outflow region (22).

4. The turbomachine (20) as claimed in claim 3, characterized in that a hydraulic connection from the pressure chamber (11) to the outflow region (22) is effected via at least one hole (24*a*, 24*b*, 24*c*) which is formed in the output shaft (24).

5. The turbomachine (20) as claimed in claim 1, characterized in that the pressure divider (9) subdivides the rear side (23*b*) with regard to the pressure load during operation into a first region (231) and a second region (232), wherein the first region (231) is loaded with a higher pressure than the second region (232).

6. The turbomachine (20) as claimed in claim 5, characterized in that the first region (231) is acted upon by the pressure level of the inflow region (21).

7. The turbomachine (20) as claimed in claim 5, characterized in that the second region (232) is acted upon by the pressure level of the outflow region (22).

8. The turbomachine (20) as claimed in claim 1, characterized in that the turbomachine (20) is constructed as a radial turbine.

9. A waste heat recovery system (1) with the turbomachine (20), as claimed in claim 1, a condenser (28), a pump (30) and an evaporator (27).

* * * * *